United States Patent [19]

Lin

[11] 4,286,429
[45] Sep. 1, 1981

[54] POLYPROPYLENE ENDLESS LOOP AND THE METHOD THEREFOR

[76] Inventor: Spencer B. T. Lin, No. 12-3, Lane 2, Suei-Duei-Tze, Tamsui, Taipei, Taiwan

[21] Appl. No.: 78,841

[22] Filed: Sep. 25, 1979

Related U.S. Application Data

[63] Continuation of Ser. No. 896,551, Apr. 14, 1978, abandoned.

[51] Int. Cl.³ .................. D02G 3/36; B65D 63/00; D02G 1/20
[52] U.S. Cl. .................................. 57/201; 57/21; 24/16 PB; 24/17 B; 24/17 AP; 24/30.5 P; 474/239; 150/11; 150/12; 229/63; 264/103; 264/295; 264/564; 428/36
[58] Field of Search .............. 74/231 MB; 156/193, 156/194; 229/63; 150/11, 12; 24/30.5 P, 30.5 R, 16 PB, 17 B, 17 AP; 264/103, 295, 564; 428/36

[56] References Cited

U.S. PATENT DOCUMENTS

| | | | |
|---|---|---|---|
| 2,061,392 | 11/1936 | Wheeler | 156/194 |
| 2,496,047 | 1/1950 | Goddard | 74/231 MB |
| 2,802,513 | 8/1957 | Stoeckel et al. | 156/193 |
| 2,851,787 | 9/1958 | Gordon | 24/16 PB |
| 2,950,152 | 8/1960 | Garceau | 156/194 |
| 3,889,872 | 6/1975 | Lin | 229/63 |
| 3,995,506 | 12/1976 | Poe | 74/231 MB |
| 3,997,943 | 12/1976 | Jones et al. | 24/16 PB |
| 4,158,250 | 6/1979 | Ringwald | 24/17 B |

FOREIGN PATENT DOCUMENTS

| | | | |
|---|---|---|---|
| 1209938 | 1/1966 | Fed. Rep. of Germany | 229/63 |
| 838172 | 6/1960 | United Kingdom | 229/63 |

*Primary Examiner*—William R. Dixon, Jr.

[57] ABSTRACT

A method is disclosed for preparing polypropylene endless loop by blow-moulding polypropylene raw materials into tubular sheet, drawing the same transversely to an extent to provide a draw ratio of at least 4, and before or after the drawing step, cutting the tubular sheet to form individual endless loops, then twisting the cut and drawer loops to provide a twisted endless loop. The preferred polypropylene endless loop product is also disclosed.

9 Claims, 4 Drawing Figures

POLYPROPYLENE ENDLESS LOOP AND THE METHOD THEREFOR

This is a continuation, of application Ser. No. 896,551, filed Apr. 14, 1978, now abandoned.

The present invention relates to a method for preparing a polypropylene endless loop and the product produced thereby.

Polypropylene rope, cord, strand and the like have been widely used for packaging purposes, but according to the best knowledge of this inventor, there are no corresponding endless means disclosed or publicity used at the present time.

The primary object of this invention is to provide a polypropylene endless loop for packaging purposes, especially being attached to a plastic bag for self-tightening the same, having a transverse length of 7.5 to 35 cm and capable of a tensile load of at least 6 kgs.

Another object of this invention is to provide a method for preparing the polypropylene endless loop.

In one aspect of the present method, it comprises the steps of blow-moulding the polypropylene raw materials into tubular sheet, cutting said sheet in suitable lengths to form individual loops, drawing said loops transversely with respect to the axis of the molded tube at a draw ratio of at least 4, then twisting said drawn loops to form the desired endless loop.

The invention is further illustrated by the accompanying drawings which set forth the appearance of the materials in the sequence of steps involved, and in which.

Figure 1:
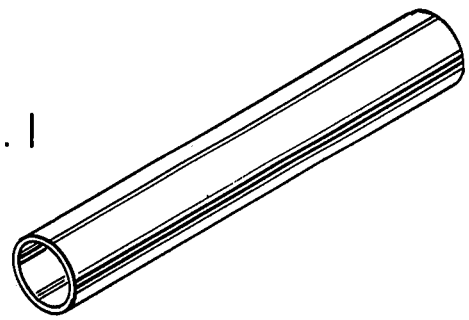
FIG. 1 shows a continuous tube of blow moulded polypropylene which is then flattened and cut.
Figure 2:
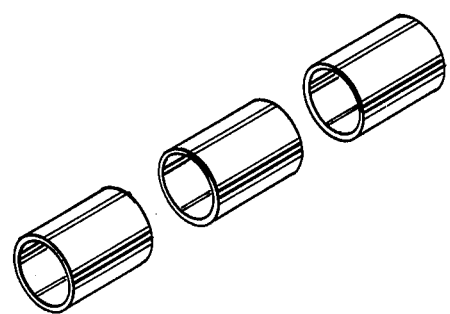
FIG. 2 shows cut portions of the tube of FIG. 1, to form individual loops.
Figure 3:
FIG. 3 shows an individual cut loop after subjected to drawing transversely to the longitudinal axis of the tube of FIG. 1.
Figure 4:
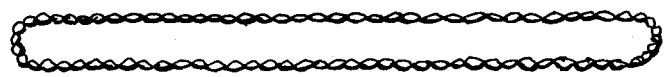
FIG. 4 shows the drawn loop of FIG. 3 after it has been twisted to form an endless loop.

In another aspect of the present method, it comprises the steps of blow-moulding the polypropylene raw materials into tubular sheet, subsequently drawing transversely said sheet at a draw ratio of at least 4, then cutting or slitting at suitable distance to form individual loops, and then twisting said sheet to form the described endless loop.

The blow-moulding of the polypropylene is carried out according to the prior art technique with a conventional blow-moulding machine, but the moulded polypropylene tubular sheet according to the present invention, for providing the desired finished loop, should have the dimensions of 15 to 50 mm and preferably 20 to 30 mm in transverse length, and 0.03 to 0.1 mm and preferably 0.05 to 0.06 mm in thickness. The term "transverse length" herein used is defined as the length measured transversely, i.e. along the radial direction of said tubular sheet, from one side to the other after said tubular sheet material has been folded to become a flat sheet material having two superimposed layers closely contacting each other.

In the first aspect as mentioned above, the tubular sheet is cut longitudinally in lengths from 10 to 60 mm, and preferably 25 to 35 mm to form individual tubes. Accordingly, the longitudinally length of each such tube becomes the width of the resulting endless loop, upon transverse drawing thereof, whereby, said width will be slightly decreased.

During transverse drawing, a force is applied to said endless tube in a transverse direction which is perpendicular to the longitudinal access of the original cut tube, with a draw ratio at least 4, and preferably from 5 to 7. The term of "draw ratio" herein used denotes the ratio of the transverse length of said loop after drawing to the same before drawing. When the draw ratio is less than 4, an insufficient tensile strength of the resulting endless loop will be obtained, while a draw ratio too great will result in the sheet being broken due to drawing over the limitations of the material.

After drawing, the transverse length of said endless loop will be in the range of 7.5 to 35 cm, and preferably from 10 to 20 cm.

The transverse drawing may be carried out at ambient temperature or under an elevated temperature which is preferably less than 40° C.

The drawn endless loop so obtained is further twisted in a convenient manner into a twisted endless loop.

In general, the polypropylene endless loop of this invention, when for packaging should exhibit a tensile strength of about 1 to 5 kilograms, and the tests carried out in following examples demonstrate that the tensile load at break of said endless loop is greater than 8 kgs, thereby meeting the requirements for its intended purpose.

EXAMPLE 1

Blow-moulded polypropylene tubular sheet having a transverse length of 25 mm and of 0.055 mm in thickness was cut into loops of 35 mm in the longitudinal direction. After drawing the loops in the transverse direction the transverse length which resulted is shown in Table 1. The width of the individual loops after drawing is in the range of 25 to 26 mm. Finally, the endless loops were twisted and subjected to a tensile test, the result of which are listed in Table 1.

TABLE 1

| Run No. | Transverse length after drawing, mm | Draw ratio by calculation | Tensile Load at break, kgs |
|---|---|---|---|
| 1 | 170 | 6.80 | 12 |
| 2 | 150 | 6.00 | 10 |
| 3 | 158 | 6.32 | 10 |
| 4 | 161 | 6.44 | 14 |
| 5 | 152 | 6.08 | 14 |
| 6 | 144 | 5.76 | 14 |
| 7 | 154 | 6.16 | 15 |
| 8 | 158 | 6.32 | 14 |
| 9 | 157 | 6.28 | 14 |
| 10 | 156 | 6.24 | 13 |

EXAMPLE 2

The procedure of Example 1, polypropylene tube cut into lengths of 30 mm. The results are shown in Table 2.

TABLE 2

| Run No. | Transverse length after drawing, mm | Draw ratio by calculation | Tensile load at break, kgs |
|---|---|---|---|
| 11 | 172 | 6.88 | 13 |
| 12 | 159 | 6.36 | 13 |
| 13 | 165 | 6.60 | 10 |
| 14 | 166 | 6.64 | 11 |
| 15 | 154 | 6.16 | 13 |
| 16 | 155 | 6.20 | 10 |
| 17 | 157 | 6.28 | 14 |
| 18 | 157 | 6.28 | 12 |

TABLE 2-continued

| Run No. | Transverse length after drawing, mm | Draw ratio by calculation | Tensile load at break, kgs |
| --- | --- | --- | --- |
| 19 | 160 | 6.40 | 12 |
| 20 | 150 | 6.00 | 13 |

EXAMPLE 3

The procedure of Example 1, was repeated with the polypropylene tube cut into lengths of 25 mm. The results shown in Table 3.

TABLE 3

| Run No. | Transverse length after drawing, mm | Draw ratio by calculation | Tensile load at break, kgs |
| --- | --- | --- | --- |
| 21 | 150 | 6.00 | 10 |
| 22 | 151 | 6.04 | 8 |
| 23 | 151 | 6.04 | 8 |
| 24 | 151 | 6.04 | 11 |
| 25 | 150 | 6.00 | 9 |
| 26 | 152 | 6.08 | 11 |
| 27 | 150 | 6.00 | 10 |
| 28 | 150 | 6.00 | 10 |
| 29 | 154 | 6.16 | 9 |
| 30 | 151 | 6.04 | 9 |

It is apparent from Table 3 that when polypropylene having a thickness of 0.055 mm is cut in lengths of 25 mm, i.e. to provide individual endless loops with a width of 25 mm, then the tensile strength after drawing is less satisfactory. Therefore, it is preferable to employ thicker polypropylene tubular sheet or wider endless sheet to give more satisfactory tensile strength.

The aforementioned embodiments serve only for illustrative purposes and by no means to restrict the scope of the present invention. Any modifications can easily be made by those skilled in the art and should be considered within the scope of the attached claims.

What I claim is:

1. A polypropylene endless loop having a transverse length of from about 7.5 to 35 cm and exhibiting a tensile strength of at least 6 Kgs obtained by cutting a polypropylene tubular sheet of from about 0.03 to 0.1 mm in thickness and 15 to 50 mm in transverse length into longitudinal lengths of from about 10 to 60 mm, transversely drawing the same at a draw ratio of at least 4 to provide a resulting transverse length of from about 7.5 to 35 cm, then twisting the same to form an endless twisted loop.

2. A polypropylene endless loop having a transverse length of from about 7.5 to 35 cm and exhibiting a tensile strength of at least 6 Kgs. obtained by transversely drawing a polypropylene tubular sheet of from about 0.03 to 0.1 mm in thickness and 15 to 50 mm in transverse length at a draw ratio of at least 4 to a resulting transverse length of 7.5 to 35 cm, then cutting the same in longitudinal lengths of from about 10 to 60 mm and finally twisting said cut length to form an endless twisted loop.

3. A method for preparing a polypropylene endless twisted loop suitable for packaging purposes comprising the steps of blow-moulding polypropylene into tubular sheet, having dimensions of from about 15 to 50 mm in transverse length and from about 0.03 to 0.1 mm in thickness, cutting said sheet to form individual endless loops having a longitudinal length of from about 10–60 mm, drawing said loops transversely with respect to the longitudinal axis thereof at a draw ratio of at least 4, and then twisting said drawn loops to form an endless twisted loop.

4. A method as set forth in claim 3, wherein the transverse drawing is carried out at a temperature in the range from ambient temperature up to 40° C.

5. A method as set forth in claim 3, wherein the draw ratio is in the range from 5 to 7.

6. A method for preparing a polypropylene endless twisted loop suitable for packaging purposes comprising the steps of blow-moulding polypropylene into tubular sheet, having dimensions of from about 15 to 50 mm in transverse length and from about 0.03 to 0.1 mm in thickness, drawing said tubular sheet transversely with respect to the longitudinal axis thereof at a draw ratio of at least 4, then cutting said drawn tubular sheet to form individual endless loops having a longitudinal length of from about 10–60 mm, and twisting said loops to form an endless twisted loop.

7. A method as set forth in claim 6, wherein the transverse drawing is carried out at a temperature in the range from ambient temperature up to 40° C.

8. A method as set forth in claim 6, wherein the draw ratio is in the range from 5 to 7.

9. The method defined in claim 3 wherein said drawn loops are twisted into a plurality of twists.

* * * * *